(12) United States Patent
Hata

(10) Patent No.: US 8,221,576 B2
(45) Date of Patent: Jul. 17, 2012

(54) PROCESS FOR THE PRODUCTION OF PACKAGING MATERIAL FOR ELECTRONIC COMPONENT CASES

(75) Inventor: Hiroshi Hata, Isehara (JP)

(73) Assignee: Showa Denko Packaging Co., Isehara-shi (JP)

(*) Notice: Subject to any disclaimer, the term of this patent is extended or adjusted under 35 U.S.C. 154(b) by 846 days.

(21) Appl. No.: 11/913,422

(22) PCT Filed: Apr. 28, 2006

(86) PCT No.: PCT/JP2006/308993

§ 371 (c)(1),
(2), (4) Date: Jan. 21, 2009

(87) PCT Pub. No.: WO2006/118251

PCT Pub. Date: Nov. 9, 2006

(65) Prior Publication Data

US 2009/0258173 A1    Oct. 15, 2009

(30) Foreign Application Priority Data

May 2, 2005 (JP) .................................. 2005-133817

(51) Int. Cl.
*B29C 65/00* (2006.01)
*B32B 37/00* (2006.01)
(52) U.S. Cl. .................... 156/308.2; 156/324; 156/324.4
(58) Field of Classification Search .................. 156/243, 156/308.2, 309.6, 309.9, 324, 324.4
See application file for complete search history.

(56) References Cited

U.S. PATENT DOCUMENTS

| 3,442,750 A * | 5/1969 | Wilcox ......................... 428/109 |
| 3,458,382 A * | 7/1969 | Buck ............................. 156/543 |
| 5,238,517 A * | 8/1993 | Heyes ........................... 156/243 |
| 6,164,358 A * | 12/2000 | Kaguma et al. ............... 156/494 |
| 2004/0142190 A1 * | 7/2004 | Kawai et al. .................. 428/461 |

FOREIGN PATENT DOCUMENTS

| JP | 57 22751 | 5/1982 |
| JP | 4 28757 | 7/1992 |
| JP | 6 24771 | 4/1994 |
| JP | 10 217392 | 8/1998 |
| JP | 2000 67823 | 3/2000 |
| JP | 2002 96419 | 4/2002 |

OTHER PUBLICATIONS

"1.3 Semicrystalline Thermoplastics" p. 4 from "Reinforced thermoplastics: composition, processing and applications" 1993 Kelleher.*

* cited by examiner

*Primary Examiner* — John Goff
(74) *Attorney, Agent, or Firm* — Oblon, Spivak, McClelland, Maier & Neustadt, L.L.P.

(57) ABSTRACT

The production method of the present invention is characterized by comprising a temporary bonding step of temporarily bonding a first sheet comprising a thermoplastic resin non-oriented film layer and a thermoplastic adhesive resin layer laminated on one surface of the thermoplastic resin non-oriented film layer and a second sheet comprising a heat resistant resin oriented film layer and an aluminum foil layer laminated on one surface of the heat resistant resin oriented film layer by passing the first sheet and the second sheet between a pair of rolls in a state in which the thermoplastic adhesive resin layer and the aluminum foil layer are brought into contact with each other to press them while heating in a state in which the thermoplastic adhesive resin does not melt to thereby obtain a pre-laminated sheet, and a complete bonding step of integrally bonding the first sheet and the second sheet by heating the pre-laminated sheet to melt the thermoplastic adhesive resin. This production method can attain a reduced plant cost and high speed production.

6 Claims, 4 Drawing Sheets

PROCESS FOR THE PRODUCTION OF PACKAGING MATERIAL FOR ELECTRONIC COMPONENT CASES

TECHNICAL FIELD

The present invention relates to a production method of a packaging material for cases for use in electronic components, such as, e.g., a lithium-ion secondary battery or a capacitor.

In this specification, the wording of "aluminum" is used to include the meaning of an aluminum and its alloy.

BACKGROUND ART

A lithium-ion secondary battery has been widely used as a power source of, e.g., a notebook-sized personal computer, a video camera, a cellular phone, or an electric automobile. As such a lithium-ion secondary battery, a battery in which the periphery thereof is covered with a case has been used. As a case packaging material, a packaging material in which a thermoplastic resin non-oriented film and an aluminum foil are bonded via a thermal adhesive resin is known. As a production method of such a packaging material, a method in which a polyolefin film and a modified polyolefin film are co-extruded between a thermoplastic resin non-oriented film and an aluminum foil which are being supplied and then they are integrally bonded (see Patent Document 1) and a method in which after applying organozol having a solid content of acid modified polyolefin onto an aluminum foil, the organozol is dried to thereby form an adhesive film, and then a polyolefin film and the adhesive film are pressure-bonded (see Patent Document 2) are known.

Patent Document 1: Japanese Unexamined Laid-open Patent Publication No. JP 2002-96419, A (claim 1, paragraph [0017])

Patent Document 2: Japanese Unexamined Laid-open Patent Publication No. JP 2000-67823, A (claim 1)

DISCLOSURE OF THE INVENTION

Problems to be Solved by the Invention

In the former method in which integral bonding is performed by co-extrusion, however, it requires not only a plurality of extruders but also a heat laminating machine. Thus, there was a problem that these facilities cost a lot of money. In other words, there was a problem that the production cost came expensive.

Furthermore, in the latter method in which an adhesive film is formed, it requires a step of drying organosol to form an adhesive film. Thus, there was a problem that the production rate was low.

The present invention was made in view of the aforementioned technical backgrounds, and aims to provide a production method of a packaging material for electronic component cases capable of attaining reduced facility costs and high-speed production.

Means to Solve the Problems

In order to attain the aforementioned object, the present invention provides the following means.

[1] A production method of a packaging material for electronic component cases, the production method comprising:

a temporary bonding step of temporarily bonding a first sheet comprising a thermoplastic resin non-oriented film layer and a thermoplastic adhesive resin layer laminated on one surface of the thermoplastic resin non-oriented film layer and a second sheet comprising a heat resistant resin oriented film layer and an aluminum foil layer laminated on one surface of the heat resistant resin oriented film layer by passing the first sheet and the second sheet between a pair of rolls in a state in which the thermoplastic adhesive resin layer and the aluminum foil layer are brought into contact with each other to press them while heating in a state in which the thermoplastic adhesive resin does not melt to thereby obtain a pre-laminated sheet; and a complete bonding step of integrally bonding the first sheet and the second sheet by heating the pre-laminated sheet to melt the thermoplastic adhesive resin.

[2] The production method of a packaging material for electronic component cases as recited in the aforementioned Item 1, wherein at the temporary bonding step, a rubber roll and a heating roll are used as the pair of rolls.

[3] The production method of a packaging material for electronic component cases as recited in the aforementioned Item 1 or 2, wherein at the temporary bonding step, the following relational expression is met:

$$(M-60) \leq T \leq (M-5),$$

where "M" is a melting point (° C.) of the thermoplastic adhesive resin and "T" is a temperature (° C.) of the thermoplastic adhesive resin at the time of pressing.

[4] The production method of a packaging material for electronic component cases as recited in any one of the aforementioned Items 1 to 3, wherein at the temporary bonding step, a pre-bonded sheet obtained by pressing the first sheet and the second sheet with the pair of rolls is cooled by bringing into contact with a cooling roll to obtain the pre-laminated sheet, and wherein at the complete bonding step, an integrally bonded sheet obtained by integrally bonding the first sheet and the second sheet is cooled by bringing into contact with a cooling roll.

[5] The production method of a packaging material for electronic component cases as recited in the aforementioned Item 4, wherein at the temporary bonding step and the complete bonding step, the following relational expression is met:

$$(X-80) \leq Y \leq (X-10),$$

where "X" is a temperature (° C.) of the heating roll, and "Y" is a temperature (° C.) of the cooling roll.

[6] The production method of a packaging material for electronic component cases as recited in the aforementioned Item 4 or 5, wherein at the temporary bonding step and the complete bonding step, the following relational expression is met:

$$1.01W \leq Z \leq 1.30W,$$

where "W" is a circumferential direction traveling speed of an external peripheral surface of the heating roll, and "Z" is a circumferential direction traveling speed of an external peripheral surface of the cooling roll.

[7] The production method of a packaging material for electronic component cases as recited in any one of the aforementioned Items 1 to 6, wherein the thermoplastic resin non-oriented film is at least one non-oriented film made of a thermoplastic resin selected from the group consisting of polyethylene, polypropylene, olefin series copolymer, acid modification thereof and ionomer, and wherein the heat resistant resin oriented film is an oriented film made of polyamide or polyester.

[8] A packaging material for electronic component cases produced by the production method as recited in any one of the aforementioned Items 1 to 7.

[9] An electronic component case produced by subjecting the packaging material for electronic component cases as recited in the aforementioned Item 8 to deep-drawing or stretch forming.

[10] A production equipment for a packaging material for electronic component cases, comprising:
a first laminating device equipped with a pressing portion comprising a heating roll and a rubber roll, and a cooling roll; and
a second laminating device equipped with a heating roll and a cooling roll.

[11] A production equipment for a packaging material for electronic component cases, comprising:
a pressing portion comprising a heating roll and a rubber roll; and
a cooling roll,
wherein at least one of the heating roll and the rubber roll is capable of moving away from the other roller.

Effects of the Invention

According to the invention as recited in the aforementioned Item 1, the first sheet and the second sheet are temporarily bonded by being pressed while being heated in a state in which the thermoplastic adhesive resin does not melt (including the state in which the surface is partially molten). This effectively prevents air from remaining between the thermoplastic adhesive resin layer and the aluminum foil layer. Therefore, it becomes possible to temporarily bond the first sheet and the second sheet without intervening air between the thermoplastic resin layer and the aluminum foil layer to obtain a pre-laminated sheet. Heating this pre-laminated sheet to melt the thermoplastic adhesive resin enables complete bonding (integral bonding) of the first sheet and the second sheet. Thus, a packaging material with no air bubble existed between the superimposed surfaces can be produced. In this production method, since a drying step of drying the solvent in the adhesive agent is not required, high speed production can be attained.

In the meantime, if the aforementioned complete bonding step is executed by omitting the temporary bonding step of the present invention, a number of air bubbles will be involved in between the superimposed surfaces of the first and second sheets, which prevents production of a high quality packaging material.

According to the invention as recited in the aforementioned Item 2, the first sheet and the second sheet are passed between the rubber roll and the heating roll under pressure, which effectively prevents air from remaining between the interposed thermoplastic adhesive resin layer and aluminum foil layer.

According to the invention as recited in the aforementioned Item 3, the production is performed in a state in which the following relational expression is met $(M-60) \leqq T \leqq (M-5)$, where "M" is a melting point (° C.) of the thermoplastic adhesive resin and "T" is a temperature (° C.) of the thermoplastic adhesive resin at the time of pressing. This enables good temporary bonding with certain bonding strength.

According to the invention as recited in the aforementioned Item 4, the pre-laminated sheet is obtained by cooling a temporarily bonded sheet obtained by pressing the first sheet and the second sheet with the pair of rolls, which can maintain the good temporarily bonded state. Furthermore, at the complete bonding step, an integrally bonded sheet obtained by integrally bonding the first sheet and the second sheet is cooled by being brought into contact with a cooling roll, which can maintain the good completely bonded state.

According to the invention as recited in the aforementioned Item 5, the production is executed in a state in which the following relational expression is met: $(X-80) \leqq Y \leqq (X-10)$, where "X" is a temperature (° C.) of the heating roll, and "Y" is a temperature (° C.) of the cooling roll. This effectively prevents generation of expansion wrinkles at the temporary bonding step and the complete bonding step.

According to the invention as recited in the aforementioned Item 6, the production is executed in a state in which the following relational expression is met: $1.01W \leqq Z \leqq 1.30W$, where "W" is a circumferential direction traveling speed of an external peripheral surface of the heating roll, and "Z" is a circumferential direction traveling speed of an external peripheral surface of the cooling roll. This prevents generation of expansion wrinkles at the temporary bonding step and the complete bonding step more effectively.

According to the invention as recited in the aforementioned Item 7, since an oriented film made of polyamide or polyester is used as the heat resistant resin orientated film, a packaging material excellent in formability can be produced. Furthermore, since at least one non-oriented film made of a thermoplastic resin selected from the group consisting of polyethylene, polypropylene, olefin series copolymer, acid deformation thereof and ionomer is used as the thermoplastic resin non-oriented film, a packaging material excellent in heat sealing performance, excellent in resistance to electrolytic solution and excellent in resistance to chemicals can be produced.

According to the invention as recited in the aforementioned Item 8, a low cost packaging material for electronic component cases with no bubble at superimposed surfaces can be provided.

According to the invention as recited in the aforementioned Item 9, a packaging material for electronic component cases having a sharply and deeply formed configuration can be obtained.

According to the invention as recited in the aforementioned Item 10, by pressing the first sheet and the second sheet under pressure in a state in which a thermoplastic adhesive resin does not melt (including a state in which a surface is partially molten) with the first laminating device, the first sheet and the second sheet can be temporarily bonded without intervening bubbles between the thermoplastic adhesive resin layer and the aluminum foil layer to thereby produce a pre-laminated sheet. By heating the pre-laminated sheet with the second laminating device while heating to melt the thermoplastic adhesive resin, complete bonding can be performed. Thus, a packaging material with no bubble between the superimposed surfaces can be manufactured.

In the production equipment of the invention as recited in the aforementioned Item 11, since this single production equipment is equipped with the functions of the first laminating device and the second laminating device of the invention as recited in the aforementioned Item 10, the installation space can be reduced drastically, which enables sufficient less installation space.

DESCRIPTION OF REFERENCE NUMERALS

Figure 1:
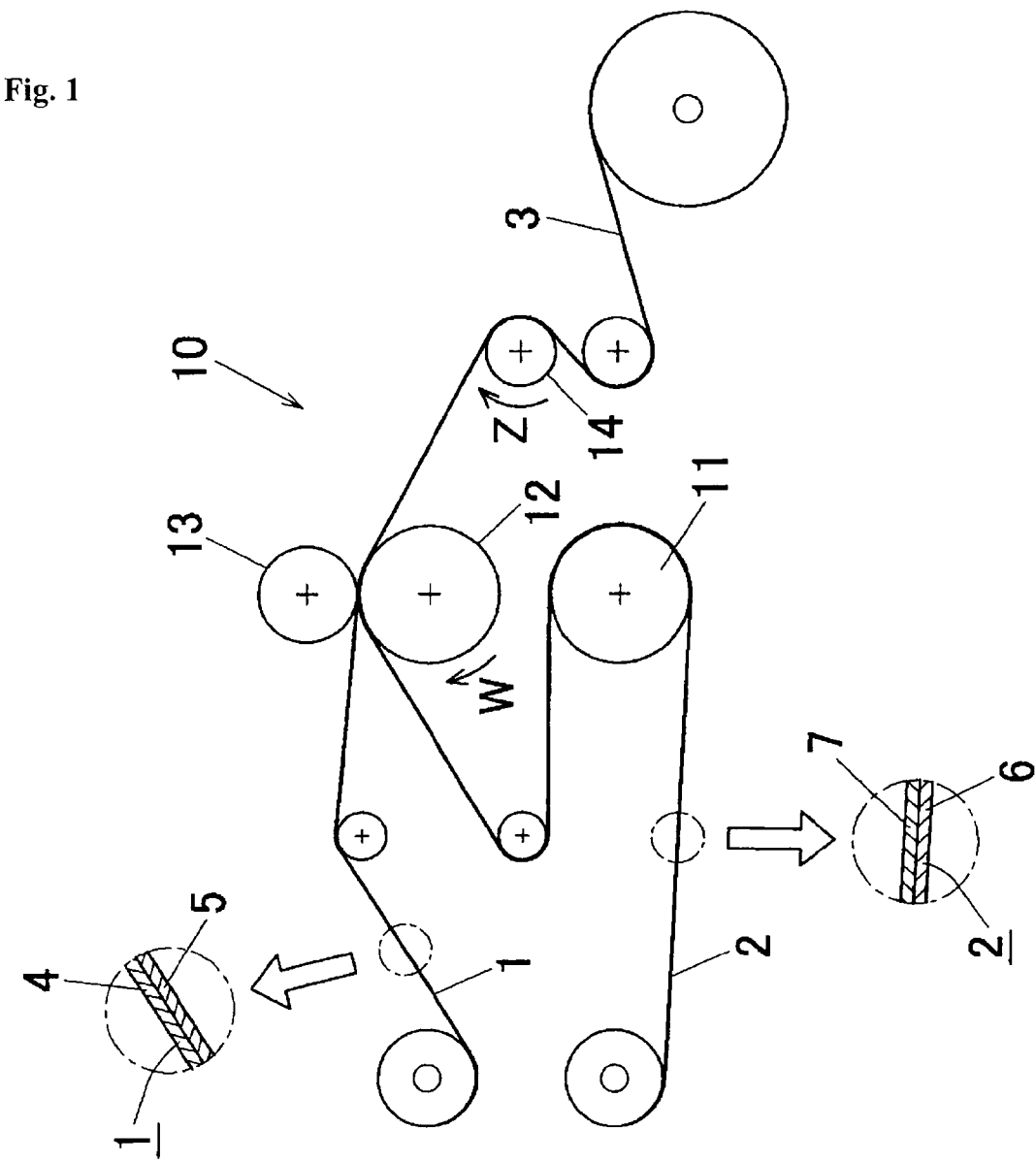
[FIG. 1] is a side view showing a step of temporarily bonding a first sheet and a second sheet to obtain a pre-laminated sheet.

1 . . . First sheet
2 . . . Second sheet
3 . . . Pre-laminated sheet
4 . . . Thermoplastic resin non-oriented film (internal layer)
5 . . . Thermoplastic adhesive resin layer
6 . . . Heat resistant resin oriented film layer (external layer)
7 . . . Aluminum foil layer
9 . . . Packaging material for electronic component cases
10 . . . Production equipment
11 . . . Preheating roll
12 . . . Heating roll
13 . . . Rubber roll
14 . . . Cooling roll
20 . . . Production equipment
21 . . . First laminating device
22 . . . Second laminating device

BEST MODE FOR CARRYING OUT THE INVENTION

A preferable embodiment of a production method of a packaging material for electronic component cases according to the present invention will be explained with referring to drawings. This production method is characterized by comprising a temporary boding step and a complete bonding step.

Figure 2:
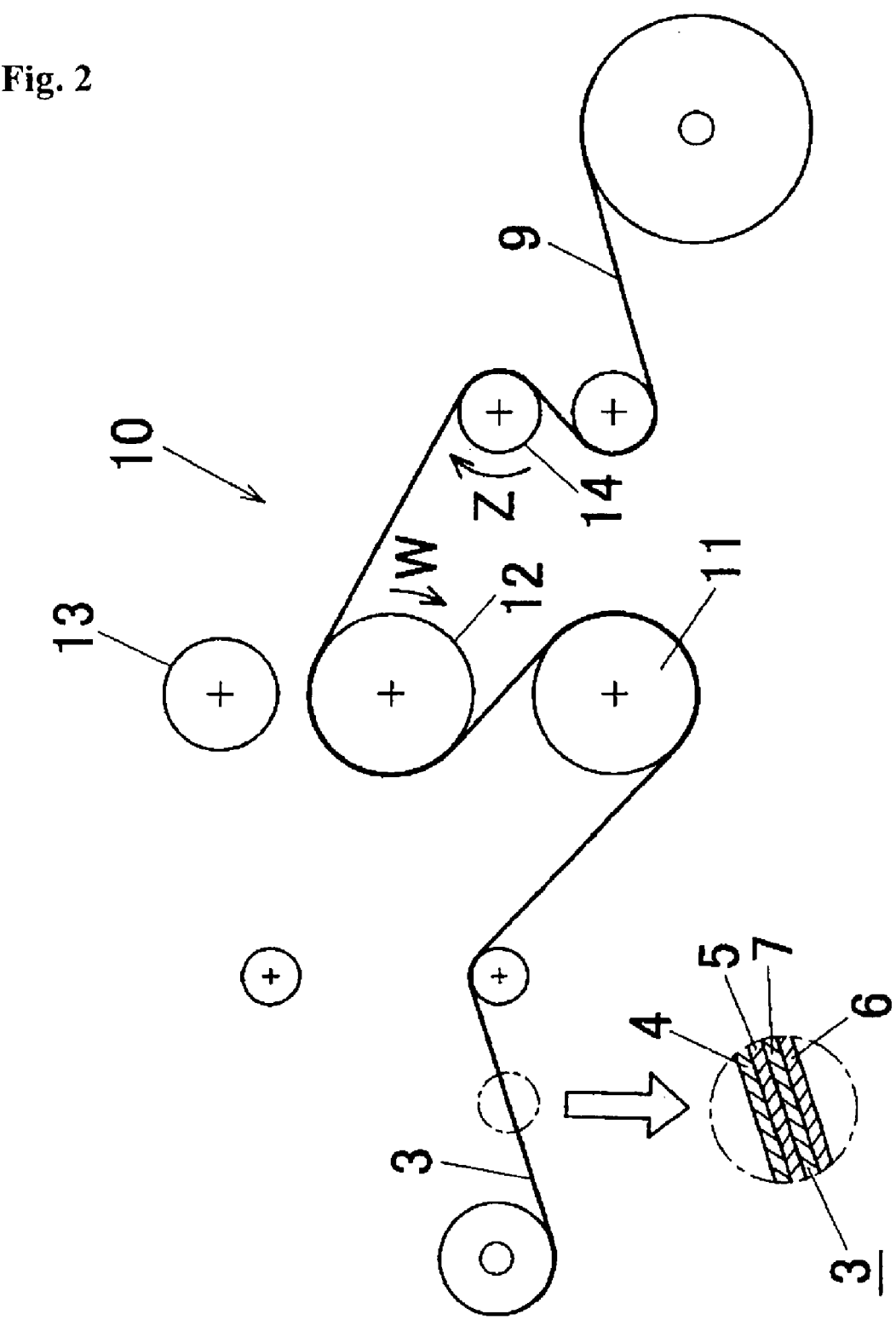
[FIG. 2] is a side view showing a step of heating the pre-laminated sheet to completely bond the first sheet and the second sheet.

Initially, a production equipment 10 used in this production method will be explained. As shown in FIGS. 1 and 2, this production equipment 10 is equipped with a pre-heating roll 11, a pair of pressing rolls 12 and 13, and a cooling roll 14. In this embodiment, as the pressing rolls 12 and 13, a heating roll 12 and a rubber roll 13 are used. The rubber roll 13 is configured to be able to move away from the heating roll 13. That is, at the temporary bonding step, as shown in FIG. 1, the rubber roll 13 is disposed at a position in proximity to the heating roll 12 to press a sheet member between these rollers 12 and 13. On the other hand, at the complete bonding step, as shown in FIG. 2, the rubber roll 13 is disposed at a position away from the heating roll 12.

In producing a packaging material, initially, a first sheet 1 in which a thermoplastic adhesive resin layer 5 is laminated on one surface of a thermoplastic resin non-oriented film layer 4 and a second sheet 2 in which an aluminum foil layer 7 is laminated on one surface of a heat resistant resin film layer 6 are prepared.

As shown in FIG. 1, the first sheet 1 and the second sheet 2 are passed between the heating roll 12 and the rubber roll 13 in a state in which the thermoplastic adhesive resin layer 5 and the aluminum foil layer 7 are brought into contact with each other to be pressed while being heated in a state in which the thermoplastic adhesive resin does not melt to thereby temporarily bond the first sheet 1 and the second sheet 2 (temporary bonding step). Thereafter, the sheet obtained by temporarily bonding the first sheet 1 and the second sheet 2 is gradually cooled by being brought into contact with the external periphery of the cooling roll 14 to obtain a pre-laminated sheet 3. This pre-laminated sheet 3 is rolled.

The heat-pressing in a state in which the thermoplastic adhesive resin does not melt can be attained by, for example, pressing the thermoplastic adhesive resin while heating the thermoplastic adhesive resin at a temperature lower than the melting point thereof. Even if the temperature of the heating roll 12 is higher than the melting point of the thermoplastic adhesive resin, in cases where the rotation speed of the heating roll 12 and that of the rubber roll 13 are fast, i.e., the pressing time by the rolls 12 and 13 is short, the heat-pressing can be attained in a state in which the thermoplastic adhesive resin does not melt. The above-mentioned state in which the thermoplastic adhesive resin does not melt includes the state in which the surface of the thermoplastic adhesive resin layer 5 is partially molten. That is, even if the heat-pressing is performed in a state in which the surface of the thermoplastic adhesive resin layer 5 is partially molten, there is no possibility of adhesion of the thermoplastic adhesive resin layer 5 to the rubber roll 13. In cases where there is a possibility of adhesion of the thermoplastic resin non-oriented film layer 4 of the first sheet 1 in contact with the rubber roll 13 to the rubber roller 13, a separation sheet, such as, e.g., a PET sheet, can be disposed on the surface of the thermoplastic resin non-oriented film layer 4.

At the temporary bonding step, the first sheet 1 and the second sheet 2 are temporarily bonded by heat-pressing them in a state in which the thermoplastic adhesive resin does not melt (including the state in which the surface is partially molten), which effectively can prevent air from remaining between the superimposed thermoplastic adhesive resin layer 5 and aluminum foil layer 7. That is, the first sheet 1 and the second sheet 2 can be temporarily bonded without intervening air between the thermoplastic adhesive resin layer 5 and the aluminum foil layer 7.

At the time of performing the pressing by the rolls, the pressing is preferably performed with the following relation met.

$$(M-60) \leq T \leq (M-5),$$

where "M" is a melting point (° C.) of the thermoplastic adhesive resin and "T" is a temperature (° C.) of the thermoplastic adhesive resin at the time of pressing. When the temperature is set to the aforementioned lower limit or above, bonding strength required for the temporary bonding can be secured. While, when the temperature is set to the aforementioned upper limit or below, bonding with air remained due to the melting of thermoplastic adhesive resin can be effectively prevented. Among other things, it is more preferable to meet the relational expression of $(M-30) \leq T \leq (M-10)$.

Furthermore, it is preferable to execute the cooling in a state in which the following relational expression is met:

$$(X-80) \leq Y \leq (X-10),$$

where "X" is a temperature (° C.) of the heating roll 12, and "Y" is a temperature (° C.) of the cooling roll 14. When the cooling is executed in this state, generation of expansion wrinkles in the pre-laminated sheet 3 can be effectively prevented. Among other things, it is more preferable to meet the relational expression of $(X-50) \leq Y \leq (X-30)$.

Furthermore, it is preferable to execute in a state in which the following relational expression is met:

$$1.01W \leq Z \leq 1.30W,$$

where "W" is a circumferential direction traveling speed of an external peripheral surface of the heating roll 12, and "Z" is a circumferential direction traveling speed of an external peripheral surface of the cooling roll 14. Execution under the aforementioned conditions can effectively prevent generation of expansion wrinkles in the pre-laminated sheet 3. Among other things, it is more preferable to meet the relational expression of $$1.1W \leq Z \leq 1.15W.$$

At the aforementioned temporary bonding step, the temperature of the pre-heating roll 11 is preferably set to 40 to 100° C. Furthermore, preferably, the temperature of the heating roll 12 is set to 100 to 180° C. and the temperature of the cooling roll 14 is set to 50 to 130° C. Furthermore, preferably, the circumferential direction traveling speed of the external peripheral surface of the heating roll 12 is set to 30 to 50 m/min., and the circumferential direction traveling speed of the external peripheral surface of the cooling roll 14 is set to 35 to 70 m/min.

Next, the coiled pre-laminated sheet 3 is removed and set to a supplying shaft of the production equipment 10 shown in the left side of the figure and the rubber roll 13 is moved upwardly to be disposed away from the heating roll 12 (see FIG. 2). Then, this pre-laminated sheet 3 is put around the pre-heating roll 11 to execute pre-heating and then brought into contact with the following heating roll 12 to melt the adhesive resin by heating the pre-laminated sheet 3 to thereby completely bond the first sheet 1 and the second sheet 2 (complete bonding step). At this complete bonding step, the rubber roll 13 is not used.

Figure 4:
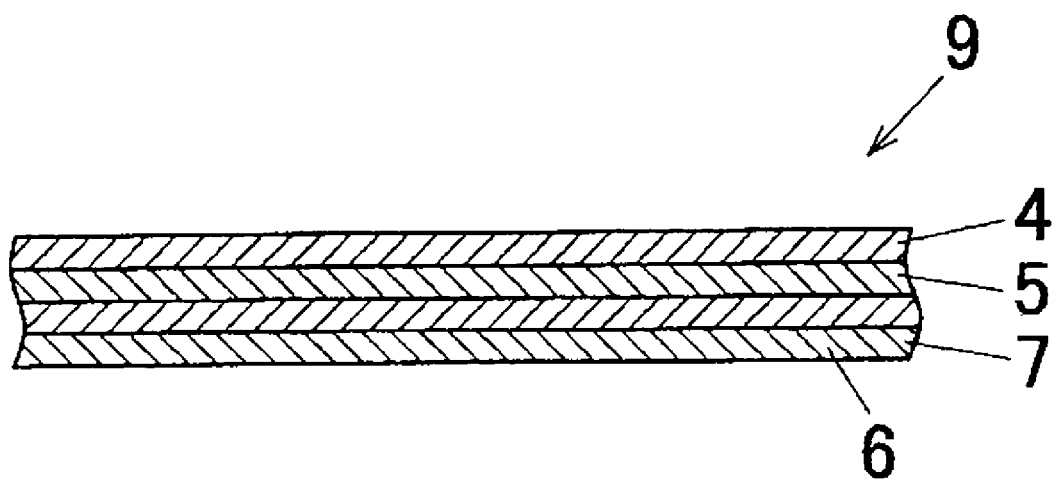
[FIG. 4] is a side view showing a packaging material for electronic component cases produced by a production equipment of this invention.

Thereafter, the completely bonded sheet is put on the external periphery of the cooling roll 14 to slowly cool it and then rolled up. Thus, a packaging material 9 for electronic component cases as shown in FIG. 4 is produced.

At the complete bonding step, it is preferable to meet the following relational expression of $$(M+10) \leq U \leq (M+60),$$

where "M" is a melting point (° C.) of the thermoplastic adhesive resin and "U" is a temperature (° C.) of the thermoplastic adhesive resin at the time of contacting the heating roll 12. When it is set to the lower limit or above, sufficient bonding strength can be attained, and when it is set to the upper limit or below, production can be performed while keeping down the energy cost.

Furthermore, at the complete bonding step, it is preferable to execute the bonding step in a state in which the following relational expression is met:

$$(X-80) \leq Y \leq (X-10),$$

where "X" is a temperature (° C.) of the heating roll 12, and "Y" is a temperature (° C.) of the cooling roll 14. When the cooling is executed in this state, generation of expansion wrinkles in the packaging material 9 can be effectively prevented.

Furthermore, at the complete bonding step, it is preferable to execute in a state in which the following relational expression is met:

$$1.01W \leq Z \leq 1.30W,$$

where "W" is a circumferential direction traveling speed of an external peripheral surface of the heating roll 12, and "Z" is a circumferential direction traveling speed of an external peripheral surface of the cooling roll 14. Execution under the aforementioned conditions can effectively prevent generation of expansion wrinkles in the packaging material 9.

At the complete bonding step, the temperature of the pre-heating roll 11 is preferably set to 40 to 150° C. Furthermore, preferably, the temperature of the heating roll 12 is set to 180 to 220° C. and the temperature of the cooling roll 14 is set to 50 to 150° C. Furthermore, preferably, the circumferential direction traveling speed of the external peripheral surface of the heating roll 12 is set to 30 to 50 m/min., and the circumferential direction traveling speed of the external peripheral surface of the cooling roll 14 is set to 35 to 70 m/min.

Figure 3:
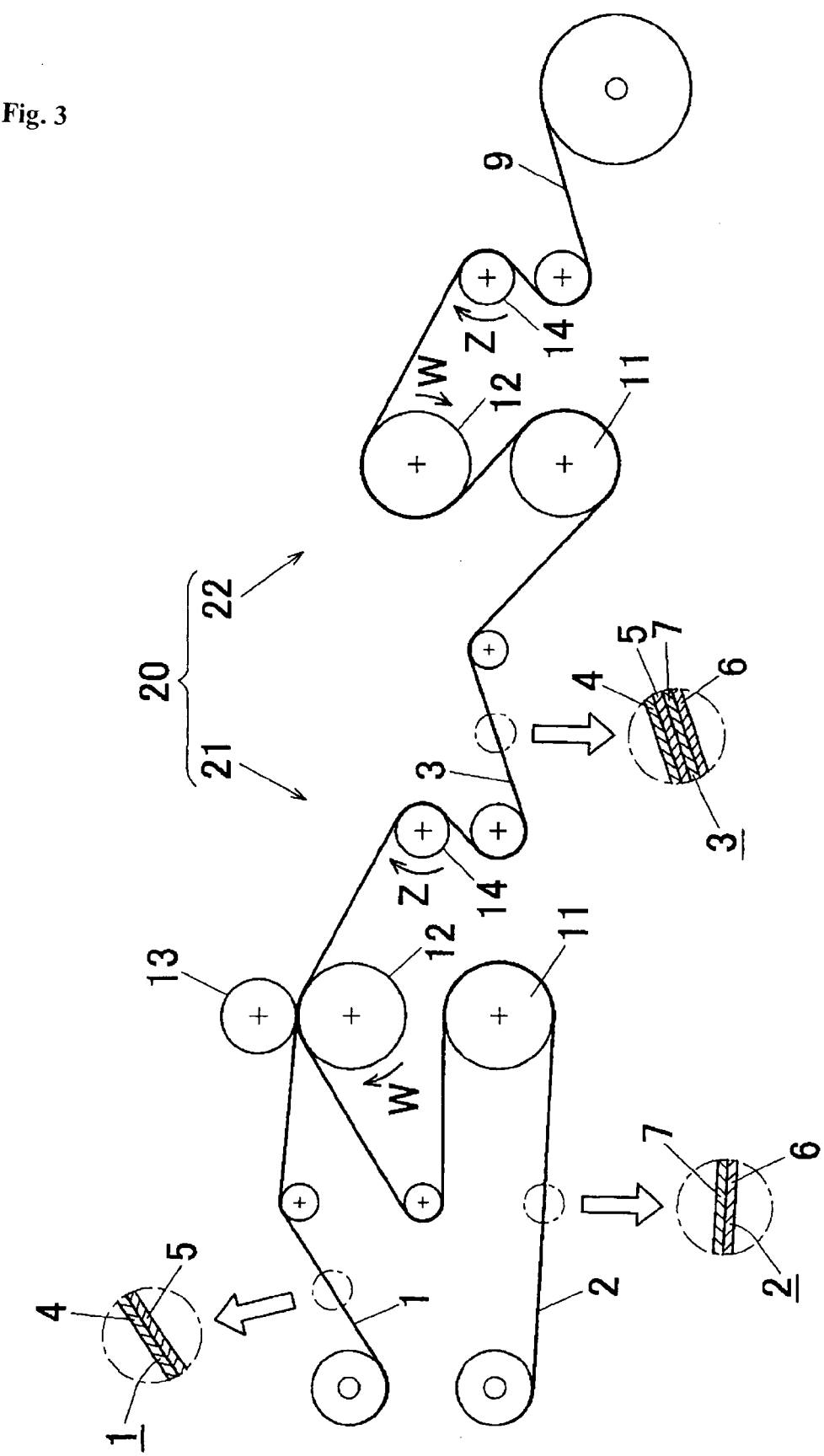
[FIG. 3] is a side view showing an example of a production equipment.

In the aforementioned illustrative production method, the temporary bonding step and the complete bonding step are executed with the same production equipment. In the present invention, however, it is not limited to such a production method. For example, as shown in FIG. 3, using a production equipment 20 equipped with a first laminating device 21 for executing the temporary bonding step and a second laminating device 22 for executing the complete bonding step, the temporary bonding step and the complete bonding step can be performed in a continuous manner to execute the production. In the production equipment shown in FIG. 3, the first laminating device 21 is equipped with a pre-heating roll 11, a pair of pressing rolls 12 and 13 and a cooling roll 14, while the second laminating device 22 is equipped with a pre-heating roll 11, a heating roll 12 and a cooling roll 14.

In this invention, the heat resistant oriented film layer (external layer) 6 is a member for mainly undertaking a role of securing good formability as a packaging material. In other words, it undertakes a role of preventing breakage of the aluminum foil due to necking at the time of forming. Although the heat resistant resin oriented film 6 is not specifically limited, an oriented film made of polyamide or polyester can be preferably used. The thickness of the heat resistant resin oriented film layer 6 is preferably set to 12 to 50 μm.

The thermoplastic resin non-oriented film layer (inner side layer) 4 a member for mainly undertaking a role of giving excellent resistance to chemicals such as strong corrosive electrolytic solution used for lithium-ion secondary batteries or the like and also giving heat sealing performance to the packaging material. Although the thermoplastic resin non-oriented film layer 4 is not specifically limited, it is preferably to use a non-oriented film made of at least one thermoplastic resin selected from the group consisting of polyethylene, polypropylene, olefin series copolymer, acid deformation thereof and ionomer. The thickness of the thermoplastic resin non-oriented film layer 4 is preferably set to 20 to 80 μm. When the thickness is set to 20 μm or above, generation of pinholes can be sufficiently prevented. When it is set to 80 μm or below, the resin amount can be reduced, which in turn can reduce the cost. Among other things, it is more preferable that the thickness of the thermoplastic resin non-oriented film layer 4 is set to 30 to 50 μm.

The heat resistant resin oriented film layer 6 and the thermoplastic resin non-oriented film layer 4 each can be a single layer or a multiple layer.

The aluminum foil layer 7 is a member for undertaking a role of giving a gas barrier nature which prevents intrusion of oxygen and/or moisture into a packaging material. As the aluminum foil 7, a pure Al or Al—Fe series alloy foil 5 to 50 μm thick can be preferably used.

Although the thermoplastic adhesive resin 5 is not specifically limited, for example, in addition to acid modified polyolefin, such as, e.g., maleic anhydride modified polyethylene and maleic anhydride modified polypropylene, urethane series resin, acrylic series resin and resin containing thermal plastic elastomer can be exemplified. The thickness of the thermoplastic adhesive resin layer 5 is preferably set to 10 to 40 μm. The thermoplastic resin layer 5 can be formed by, for example, laminating a thermoplastic adhesive resin film on one surface the thermoplastic resin non-oriented film layer 4.

By subjecting the packaging material 9 for electronic component casing produced by the production method of the present invention to deep-drawing or stretch forming, an electronic component case can be obtained. Thus, by surrounding an electronic component body, for example, a battery, such as a lithium-ion secondary battery, with the electronic component case, an electronic component can be obtained.

EXAMPLES

Hereinafter, concrete examples of the present invention will be explained.

Example 1

Temporary Bonding Step

A first sheet 1 in which a maleic anhydride acid modified polypropylene film 5 (thermoplastic adhesive resin layer) 15 μm thick was laminated on one surface of a polypropylene film 4 (thermoplastic resin non-oriented film layer) 35 μm thick and a second sheet 2 in which an aluminum foil 7 having a thickness of 40 μm was laminated on one surface of a polyamide film 6 (heat resistant resin oriented film layer) 25 μm thick were passed between the heating roll 12 and the rubber roll 13 of the production equipment 10 shown in FIG. 1 in a state in which the maleic anhydride acid modified polypropylene film 5 and the aluminum foil 7 were in contact with each other to be pressed and temporarily bonded. Thereafter, it was slowly cooled by being brought into contact with the cooling roll 14 to obtain a pre-laminated sheet 3. Then, the sheet was coiled.

At the temporary bonding step, the temperature of the pre-heating roll 11 was set to 70° C., the temperature of the heating roll 12 was set to 130° C., and the temperature of the cooling roll 14 was set to 80° C. The melting point of maleic anhydride acid deformed polypropylene is 168° C. The circumferential direction driving speed of the external periphery of the heating roll 12 was 36 m/min., and the circumferential direction driving speed of the external periphery of the cooling roll 14 was 40 m/min.

(Complete Bonding Step)

Next, as shown in FIG. 2, the coiled pre-laminated sheet 3 was set to the supplying shaft of the production equipment 10 shown in FIG. 1 and the rubber roll 13 was moved upward. Then, as shown in FIG. 2, the pre-laminated sheet was pre-heated by being brought into contact with the pre-heating roll 11 and then brought into contact with the next heating roll 12 to melt the adhesive resin (maleic anhydride acid modified polypropylene) 5 to thereby completely bond the first sheet 1 and the second sheet 2. Thereafter, the completely bonded sheet was brought into contact with the external periphery of the cooling roll 14 to be slowly cooled. Thus, a packaging material 9 for electronic component cases as shown in FIG. 4 was produced.

At this complete bonding step, the temperature of the pre-heating roll 11 was set to 100° C., the temperature of the heating roll 12 was set to 200° C., and the temperature of the cooling roll 14 was set to 90° C. The circumferential direction driving speed of the external periphery of the heating roll 12 was 36 m/min., and the circumferential direction driving speed of the external periphery of the cooling roll 14 was 40 m/min.

Example 2

A packaging for electronic component cases was produced in the same manner as in Example 1 except that at the temporary bonding step the temperature of the heating roll was set to 150° C. and the temperature of the cooling roll was set to 90° C.

Example 3, 4

A packaging for electronic component cases was produced in the same manner as in Example 1 except of the conditions shown in Table 1.

Comparative Example 1

A packaging material 9 was produced in the same manner as in Example 1 except that the temporary bonding step was omitted.

As to each packaging material obtained as mentioned above, the presence or absence of bubbles and the present or absence of wrinkles were observed with eyes to evaluate the appearance of the packaging material. The results are shown in Table 1.

TABLE 1

| | Temporary bonding step | | | | Complete bonding step | | | | Evaluation | |
|---|---|---|---|---|---|---|---|---|---|---|
| | Temp. X of heating roll X (° C.) | Temp. Y of cooling roll (° C.) | Traveling speed of heating roll (m/min.) | Traveling speed of cooling roll (m/min.) | Temp. X of heating roll (° C.) | Temperature Y of cooling roll (° C.) | Traveling speed of heating roll (m/min.) | Traveling speed of cooling roll (m/min.) | Presence or absence of bubbles | Present or absence of wrinkles |
| Ex. 1 | 130 | 80 | 36 | 40 | 200 | 90 | 36 | 40 | Absence | Absence |
| Ex. 2 | 150 | 90 | 36 | 40 | 200 | 90 | 36 | 40 | Absence | Absence |
| Ex. 3 | 120 | 70 | 40 | 45 | 210 | 110 | 40 | 45 | Absence | Absence |
| Ex. 4 | 160 | 100 | 45 | 50 | 190 | 80 | 45 | 50 | Absence | Absence |
| Comp. Ex. 1 | Nil | | | | 200 | 90 | 36 | 40 | Presence | Presence |

Traveling speed of heating roll . . . Circumferential direction traveling speed of the external surface of heating roll
Traveling speed of cooling roll . . . Circumferential direction traveling speed of the external surface of cooling roll As will be apparent from Table 1, in the packaging material for electronic component cases of Examples 1-4 produced by the production method of the present invention, no bubble and almost no wrinkle was observed, and the appearance was good. On the other hand, in Comparative Example 1 in which no temporary bonding step was executed, bubbles were observed, and the appearance was poor.

This application claims priority to Japanese Patent Application No. 2005-133817 filed on May 2, 2005, the entire disclosure of which is incorporated herein by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

INDUSTRIAL APPLICABILITY

A packaging material for electronic component cases produced by the production method of the present invention can be used for, e.g., a packaging material for cases for use in electronic components, such as, e.g., a lithium-ion secondary battery or a capacitor.

The invention claimed is:

1. A production method of a packaging material for electronic component cases, the production method comprising:
   a temporary bonding which temporarily bonds a first sheet comprising a thermoplastic resin non-oriented film layer and a thermoplastic adhesive resin layer laminated on one surface of the thermoplastic resin non-oriented film layer and a second sheet comprising a heat resistant resin oriented film layer and an aluminum foil layer laminated on one surface of the heat resistant resin oriented film layer by passing the first sheet and the second sheet between a pair of rolls in a state in which the thermoplastic adhesive resin layer and the aluminum foil layer are brought into contact with each other to press the thermoplastic adhesive resin layer and the aluminum foil layer while heating in a state in which the thermoplastic adhesive resin does not melt to thereby obtain a pre-laminated sheet; and
   a complete bonding which integrally bonds the first sheet and the second sheet by heating the pre-laminated sheet to melt the thermoplastic adhesive resin,
   wherein at the temporary bonding, a pre-bonded sheet obtained by pressing the first sheet and the second sheet with the pair of rolls is cooled by bringing into contact with a cooling roll to obtain the pre-laminated sheet, and at the complete bonding, an integrally bonded sheet obtained by integrally bonding the first sheet and the second sheet is cooled by bringing into contact with a cooling roll.

2. The production method of a packaging material for electronic component cases as recited in claim 1, wherein at the temporary bonding, the first sheet and the second sheet are passed between the pair of rolls comprising a rubber roll and a heating roll.

3. The production method of a packaging material for electronic component cases as recited in claim 1, wherein the temporary bonding satisfies:

$$(M-60) \leq T \leq (M-5),$$

where M is a melting point of the thermoplastic adhesive resin and T is a temperature of the thermoplastic adhesive resin at a time of pressing.

4. The production method of a packaging material for electronic component cases as recited in claim 2, wherein the temporary bonding and the complete bonding satisfy:

$$(X-80) \leq Y \leq (X-10),$$

where X is a temperature of the heating roll, and Y is a temperature of the cooling roll.

5. The production method of a packaging material for electronic component cases as recited in claim 2, wherein the temporary bonding and the complete bonding satisfy:

$$1.01W \leq Z \leq 1.30W,$$

where W is a circumferential direction traveling speed of an external peripheral surface of the heating roll, and Z is a circumferential direction traveling speed of an external peripheral surface of the cooling roll.

6. The production method of a packaging material for electronic component cases as recited in claim 1, wherein the thermoplastic resin non-oriented film is at least one non-oriented film made of a thermoplastic resin selected from the group consisting of polyethylene, polypropylene, olefin series copolymer, acid modification thereof and ionomer, and wherein the heat resistant resin oriented film is an oriented film made of polyamide or polyester.

* * * * *